F. A. ANTHONY.
FOLDING CAMERA.
APPLICATION FILED SEPT. 29, 1906.

903,533.

Patented Nov. 10, 1908.
3 SHEETS—SHEET 1.

Witnesses
A. R. Appleman
F. M. Donsbach

Inventor
Frederick A. Anthony
By his Attorney
Phillips Abbott

F. A. ANTHONY.
FOLDING CAMERA.
APPLICATION FILED SEPT. 29, 1906.

903,533.

Patented Nov. 10, 1908.

3 SHEETS—SHEET 2.

Witnesses
A. R. Appleman
F. M. Donsbach

Inventor
Frederick A. Anthony
By his Attorney
Phillips Abbott

F. A. ANTHONY.
FOLDING CAMERA.
APPLICATION FILED SEPT. 29, 1906.

903,533.

Patented Nov. 10, 1908.

3 SHEETS—SHEET 3.

Witnesses:
Max B. A. Doring
Vincent Scully

Frederick A. Anthony Inventor
By his Attorney Phillips Abbott

UNITED STATES PATENT OFFICE.

FREDERICK A. ANTHONY, OF HACKENSACK, NEW JERSEY.

FOLDING CAMERA.

No. 903,533.   Specification of Letters Patent.   Patented Nov. 10, 1908.

Application filed September 29, 1906. Serial No. 336,800.

*To all whom it may concern:*

Be it known that I, FREDERICK A. ANTHONY, a citizen of the United States, and a resident in the town of Hackensack, county of Bergen, State of New Jersey, have invented a new and useful Improvement in Folding Cameras, of which the following is a specification, reference being had to the accompanying drawings, in which—

Figure 1:
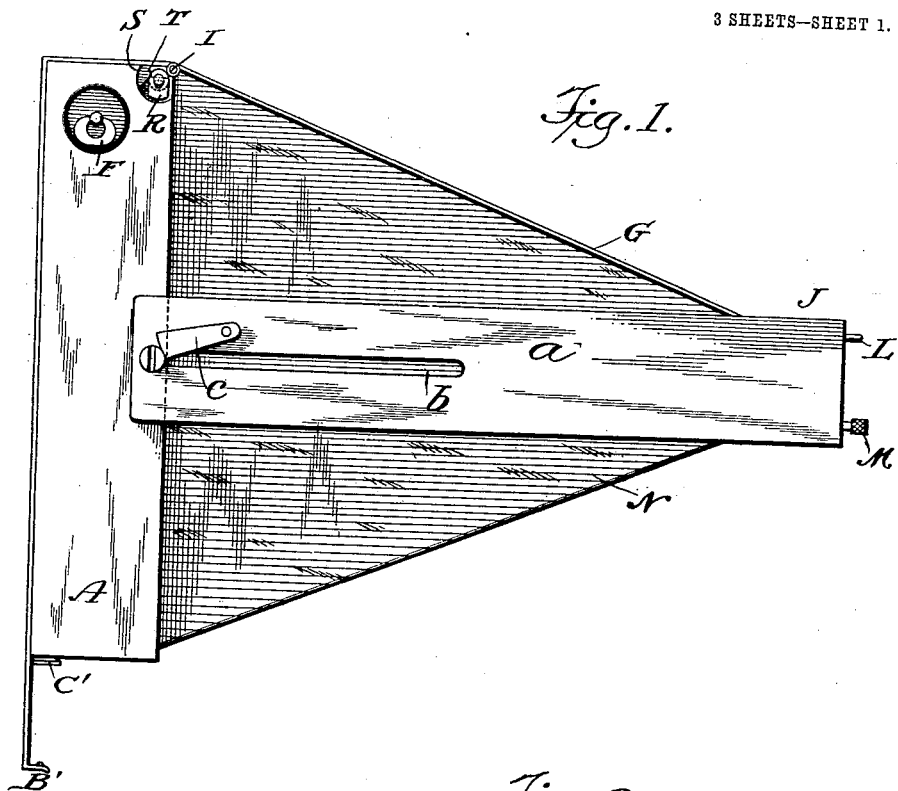
Figure 2:
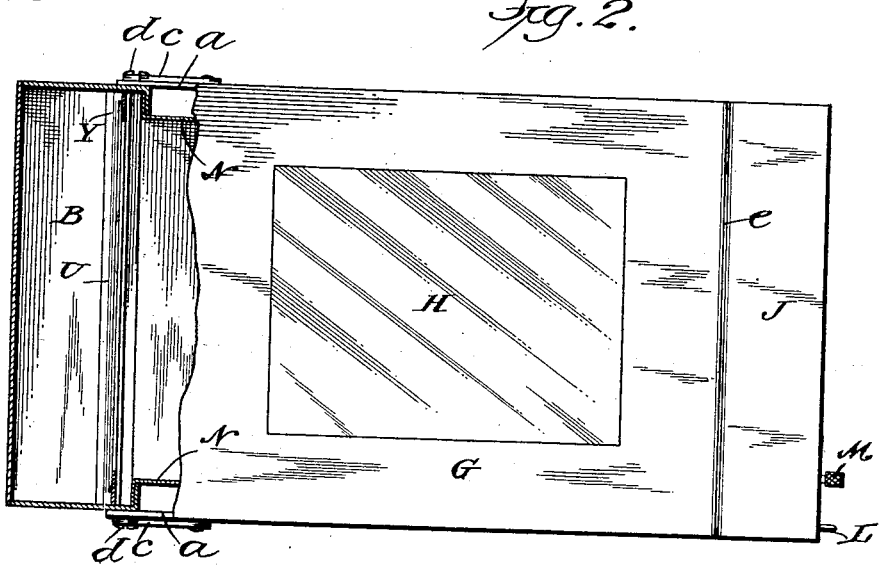
Figure 3:
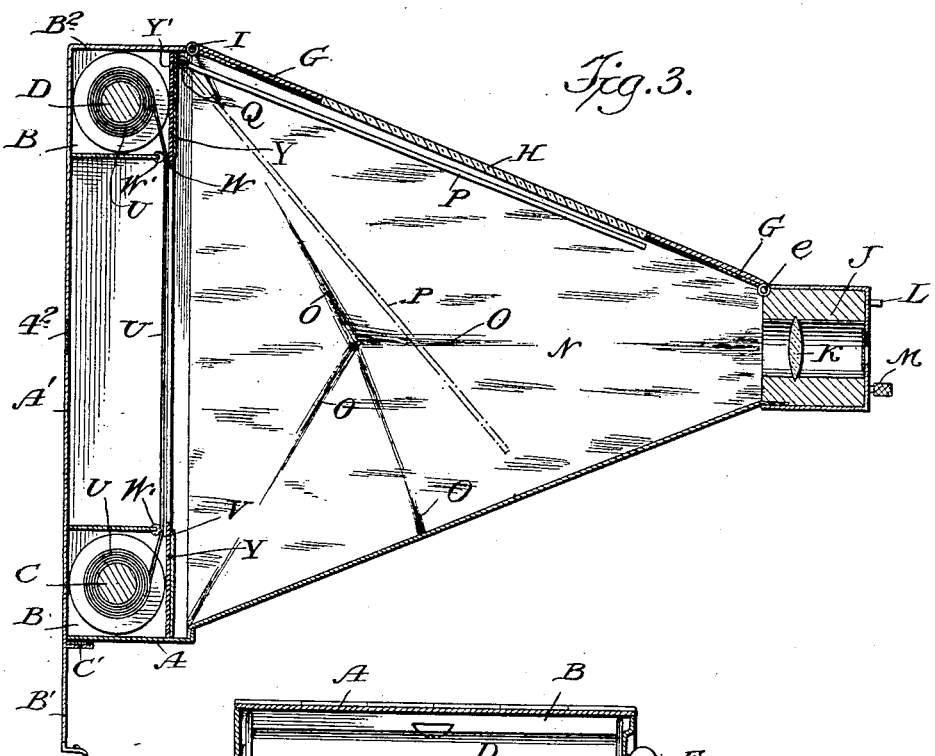
Figure 4:
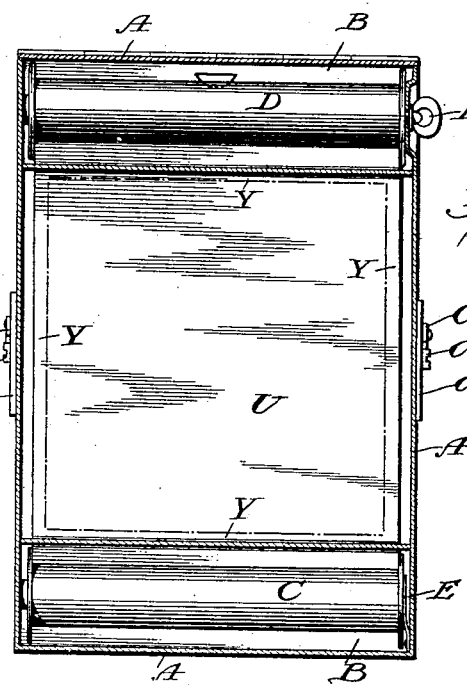
Figure 5:
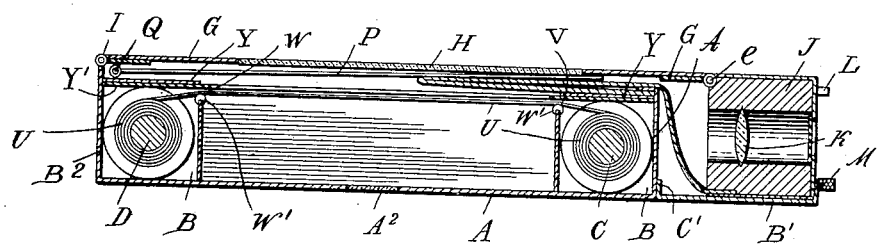

Figure 1 illustrates a side elevation of the camera open. Fig. 2 illustrates a top view of the camera open, partly broken away at the rear to show interior construction. Fig. 3 illustrates a vertical sectional view through the center of the lens. Fig. 4 illustrates a view of the roll holder or rear part of the camera, the back board being removed or swung aside. Fig. 5 shows a section similar to Fig. 3 with the camera folded.

A is the box or main frame of the camera, B, B, are two roll holding compartments, in one of which the supply roll C is placed and in the other the receiving roll D. These compartments are provided with the usual supports for the spools and with suitable friction devices, indicated by E, Fig. 4, and with suitable winding devices, indicated by F, Fig. 4. These parts are so well known that they do not require special description.

G is a frame, which supports the focusing glass H. The frame is pivoted or hinged to the main frame at I, and on its free end supports and carries a casing J, within which is the lens K and suitable shutter and diaphragm devices, some of the parts which actuate them being shown at L, M. These features may be of any suitable construction and do not require special description.

N is a flexible bellows-like structure, which is connected at all its rear edges to the main frame A and at its upper edges to the pivoted frame G, and at all its front edges to the lens and shutter casing J. It folds in gusset-like laps upon itself, as indicated by the shading, O, O, (see Fig. 3) during the opening and closing of the camera.

P is the mirror. It is pivoted within the camera at Q and its axis or pivot is provided with a thumb-key R (see Fig. 1) accessible from the outside of the camera. It is preferably countersunk in a little metallic cup S, in which is a stiff spring T, which exerts sufficient friction on the shaft of the mirror to hold it in any position in which it may be left. As seen in Fig. 3, the mirror, when swung upwardly, as shown in full lines, will rest against the inside of the ground glass frame and will be out of the way of the light entering through the lens, but when swung downward, as indicated by broken lines, it assumes a position in which it will reflect the image against the ground glass focusing plate, as usual.

The sensitized film and accompanying black paper, indicated by the letter U, are passed from the supply spool through a slit V made in the side of the spool compartment across the focal plane, then through another slit W made in the side of the opposite compartment, and are then wound up on the receiving spool D, as usual.

In order that light may be excluded from the compartments, I prefer to apply felt at the edges of the slits, as seen at W'. Also in order that the edges of the film and black paper may be held flat across the focal plane, thus assuring better negatives, I prefer to use a confiner which may be a mere plate of hard rubber, card board, or the like, indicated at Y; the central part of it corresponding to the field of the camera, will be cut away leaving the edges intact which lap on to the front surfaces of the film at the edges of the field, thus maintaining the film in proper flat condition. This confiner may be a permanent and fixed part of the apparatus, but I prefer that it should be removable, so that when removed there may be more space at the slits V and W for the insertion of the film and black paper. The confiner may be readily inserted when the back board A' is swung outwardly and that this may be more conveniently done, I make the slits V and W in the sides of the roll compartments sufficiently wide to permit the confiner to pass through them together with the film and black paper.

In order that the confiner may be easily removed, I make a recess or incision Y' in it, whereby, upon the removal of the spool, it may be easily started outwardly and its edge projected which may then be conveniently taken hold of for the complete withdrawal of the confiner.

The film roll compartments are located in rear of the focal plane and the confiner is located in a plane in front of the film rolls. When this is the case the film will be drawn from one compartment to the other as indicated in Fig. 3 and the confiner best serves primarily to hold the edges of the film and black paper flat across the focal plane, as above stated.

The rear of the camera may be closed in any suitable manner. I prefer to do so by a back board A', provided with the usual peep hole A² through which to observe the transit of the film. The back board is also provided with a catch B' at its free edge, which suitably engages with a co-acting device on the front of the casing J when it is brought into engagement with the catch B' upon closing the camera. At the other side or edge the back board is provided with a rectangular part B², adapted to extend across the edge of the main box A, and it is pivoted at its edge by the same hinge I, upon which the frame for the focusing glass is hinged. It is necessary that the back board be held closed during the time the camera is open. I therefore provide a catch for it independent of the catch B'. This other catch is illustrated at C', see Fig. 3. It is also necessary that when the camera is open, and the lens projected, the parts be reliably held in their then position. Various devices may be used for this purpose, but I prefer to employ side bars, $a$, $a$, slotted as at $b$ (see Fig. 1) and provided with spring actuated locking dogs $c$ and pins or studs $d$ on the box A. These side bars are rigidly connected with the lens casing J.

It will be readily seen that during the opening and closing of the camera, the pins $d$ move through the slots in the bars and that when fully extended, the dogs will fall behind the studs and securely lock the parts in their extended position, and that during the act of closing the camera, the side bars swing relative to the main box A and when the camera is fully closed, they lie parallel with and close to the sides of the box A. If this construction is employed, I prefer that the ground glass frame should be pivoted to the casing J, as illustrated at $e$.

The swinging frame G carrying the focusing glass is of such dimensions as to entirely cover the front of the camera box when the camera is folded and there is no part of the box which projects beyond the focusing glass frame at any time, thus affording a smooth and compact arrangement as indicated in Fig. 5. The mirror is so hinged that the act of swinging the focusing glass frame inwards to close the camera necessarily carries the mirror into a vertical position parallel with the focal plane, as clearly indicated in Fig. 5 and the bellows are so shaped and arranged as to be folded in between the front of the box and the focusing glass frame, as also indicated in Fig. 5.

It will be obvious to those who are familiar with this art that modifications may be made in the details of construction and yet the essentials of the invention be employed. I therefore do not limit myself to the details as described and illustrated except as required by the scope of the claims.

The drawings, while illustrating clearly the features of the invention, do not attempt to show all parts of a commercially operative camera and are not drawn to any particular scale. The parts should be, of course, of such relative dimensions as to enable them to coöperate properly and the usual appurtenances in this class of cameras may be easily added.

I claim:

1. A folding camera comprising a box provided with storage space for sensitized material, a swinging focusing glass frame hinged to the upper front edge of the box and which is of such dimensions as to entirely cover the front of the box when the camera is closed, a lens casing carried by the swinging frame, a mirror hinged to the box near its upper front edge, and means for holding the parts in their extended and also in their vertical positions.

2. A folding camera comprising a box provided with film roll compartments, a swinging focusing glass frame hinged at the upper front edge of the box and of such dimensions as to form the front of the camera when the latter is closed, a lens casing carried by the swinging frame, a mirror hinged at the upper front edge of the box and means for holding the parts in their extended and also in their retracted positions.

3. A folding camera comprising a box with film roll compartments in rear of the focal plane, a swinging focusing glass frame hinged at an outer front edge of the box and which covers the front of the box when the camera is closed, a lens casing attached to the swinging frame and a mirror movably mounted below the swinging frame and folding therewith against the front of the camera box.

4. A camera comprising a box, a focusing glass frame hinged at an outer front edge thereof and which forms the front of the camera when closed, a lens casing attached to the swinging frame, a movable mirror below said swinging frame and folding therewith against the front of the box and means for holding the parts in their extended and also in their retracted positions.

5. A folding camera comprising a box, a focusing glass frame adapted to fold against the box to a position parallel with the focal plane and to cover the front of the box when so folded, a movable mirror connected with the box and adapted to be moved into position for focusing and also out of that position into parallelism with the focusing glass frame when the camera is extended for use and also when the camera is folded into parallelism with the focal plane to be moved with said focusing glass frame into such position parallel with the focal plane, means for holding the parts in their extended and also in their retracted positions and a lens and shutter casing connected with the focusing glass frame.

6. A folding camera comprising a box provided with storage space for sensitized material located in rear of its front edges, a focusing glass frame hinged to the box at one of its front edges and adapted to be folded into parallelism with the focal plane, a lens casing carried by the swinging frame, a movable mirror below said frame and means for holding the parts in their extended and also in their retracted positions.

7. A folding camera comprising a camera box, a focusing glass frame hinged to one of the front edges of the box and which forms the front of the camera when folded, a mirror hinged to the box near the hinge for the focal glass frame, a bellows and a lens casing both projected and retracted by the movements of the focusing glass frame, side bars connected to the lens casing and to the box midway between its upper and lower ends, devices for holding said side bars parallel with each other in a horizontal plane and which allow said side bars to assume a vertical position parallel with each other when the camera is folded.

8. A folding camera comprising a box, a focusing glass frame hinged at one of the front edges of the box, a lens casing connected with said frame, bellows connecting the lens casing, the focusing glass frame and the box, slotted side bars connected with the lens casing and which, when the camera is extended, lie in a horizontal plane parallel with each other, and devices for holding the side bars in such position which also permit said bars to retract and assume a vertical position parallel with each other at the sides of the box.

9. A camera comprising a box provided with film roll compartments located in rear of the focal plane and a confiner arranged in front of the film as it passes from roll to roll against which the film bears and which serves to hold the film flat across the focal plane.

In testimony whereof I have signed my name to this specification in the presence of two subscribing witnesses.

FREDERICK A. ANTHONY.

Witnesses:
PHILLIPS ABBOTT,
F. M. DONSBACH.